(12) United States Patent
Phillips

(10) Patent No.: US 6,240,301 B1
(45) Date of Patent: May 29, 2001

(54) DIVERSITY ANTENNA IN A SIM CARD PACKAGE

(75) Inventor: John C. Phillips, New Hill, NC (US)

(73) Assignee: Ericcson Inc., RTP, NC (US)

( * ) Notice: Subject to any disclaimer, the term of this patent is extended or adjusted under 35 U.S.C. 154(b) by 0 days.

(21) Appl. No.: 09/181,983

(22) Filed: Oct. 29, 1998

(51) Int. Cl.[7] .................................................. H04M 1/00
(52) U.S. Cl. ............................ 455/550; 455/90; 455/556; 455/558
(58) Field of Search ..................................... 361/737, 752, 361/796, 803, 814, 727, 728, 730, 809; 455/90, 550, 551, 552, 553, 556, 558; 235/441, 486; 257/678, 679; 439/325, 326

(56) References Cited

U.S. PATENT DOCUMENTS

| | | | |
|---|---|---|---|
| 5,465,401 | * | 11/1995 | Thompson ............................. 455/558 |
| 5,708,833 | * | 1/1998 | Kinney et al. ........................ 395/800 |
| 5,764,193 | * | 6/1998 | Uchino et al. ........................ 343/725 |
| 5,822,183 | * | 10/1998 | Kanda et al. ......................... 361/684 |
| 5,877,488 | * | 3/1999 | Klatt et al. ........................... 235/486 |
| 5,883,786 | * | 3/1999 | Nixon .................................. 361/737 |
| 5,887,145 | * | 3/1999 | Harari et al. ......................... 395/282 |
| 5,894,597 | * | 4/1999 | Schwartz et al. .................... 455/558 |
| 5,918,189 | * | 6/1999 | Kivela ................................. 455/575 |
| 5,923,082 | * | 7/1999 | Takemura ............................ 257/679 |
| 5,933,328 | * | 8/1999 | Wallace et al. ...................... 361/737 |
| 5,943,020 | * | 8/1999 | Liebendoerfer et al. ............ 343/702 |
| 5,943,624 | * | 8/1999 | Fox et al. ............................. 455/556 |
| 5,957,718 | * | 9/1999 | Cheng et al. ........................ 439/347 |
| 5,970,402 | * | 10/1999 | Vermeer .............................. 455/347 |
| 5,978,655 | * | 11/1999 | Ohura et al. ......................... 455/41 |
| 5,986,609 | * | 11/1999 | Spall .................................... 343/702 |
| 5,991,864 | * | 11/1999 | Kinney et al. ........................ 712/1 |
| 6,009,315 | * | 12/1999 | De Larminat et al. ................ 455/90 |
| 6,025,814 | * | 2/2000 | Nelson et al. ........................ 343/878 |
| 6,028,555 | * | 2/2000 | Harano ................................. 343/702 |
| 6,029,892 | * | 2/2000 | Miyake ................................ 235/380 |
| 6,031,503 | * | 2/2000 | Preiss, II et al. ..................... 343/770 |
| 6,035,216 | * | 3/2000 | Cheng et al. ........................ 455/558 |
| 6,148,192 | * | 11/2000 | Ahvenainen ......................... 455/411 |

OTHER PUBLICATIONS

CEN Specification ENV 1375–1, "Identification Card Systems—Intersector Integrated Circuits(s) Card Additional Formats—Part 1: ID–000 Card Size and Physical Characteristics".

* cited by examiner

Primary Examiner—Curtis Kuntz
Assistant Examiner—Barry W. Taylor
(74) Attorney, Agent, or Firm—Coats & Bennett, P.LLC.

(57) ABSTRACT

A diversity antenna module includes a diversity antenna and preferably has outer dimensions no larger than a SIM card. The diversity antenna module mates with a shell housing communications electronics for a wireless communications device, such as communications electronics adapted for PDC operation. The diversity antenna module, when mated to the shell, provides the communications electronics within the shell with an alternative antenna, as is required by the PDC specifications. The same shell, or another shell of the same mechanical dimensions, may alternatively house a different set of communications electronics, such as some adapted for GSM operation. A traditional SIM module may be mated to this second shell to provide alternative communications functionality. Thus, the diversity antenna module allows for a single mechanical design of the shell to be used to house alternative communications electronics and mate with the corresponding modules to provide wireless communications functionality under differing standards, thereby reducing the number of mechanical packaging designs that must be developed.

16 Claims, 5 Drawing Sheets

DIVERSITY ANTENNA IN A SIM CARD PACKAGE

FIELD OF THE INVENTION

The present invention relates to the field of mechanical packaging of wireless communications devices, and more particularly to a module having dimensions no larger than a SIM card that includes a diversity antenna for a wireless communications device.

BACKGROUND OF THE INVENTION

There are many different standards worldwide for wireless communication devices, with differing requirements. For example, wireless communication mobile terminals, such as cellular telephones, adapted for use according to the Global System for Mobile Communications (GSM) standard require a subscriber identity module (SIM) and SIM card reader for their operation. For reference, the GSM technical specifications are published by the European Telecommunications Standard Institute (ETSI) and are incorporated in their entirety by reference herein. In contrast, cellular phones operating to the Pacific Digital Cellular (PDC) standard such as that used in Japan, do not require a SIM card or SIM card reader, but do require a secondary, or diversity, antenna in addition to the main antenna. The diversity antenna is a radiowave antenna of a different type than the mobile terminal's main antenna which provides an alternate source of received signals; typically the receiver portion of the wireless communications device monitors the received signal at both the main antenna and the diversity antenna, and selects the stronger signal for processing. Because of these differing requirements, phones designed to service these markets typically require different mechanical components to meet the different requirements, even if the phones are otherwise very similar in functionality.

Until now, wireless communication devices designed for such different systems have simply employed different mechanical platforms, such as different shell enclosures and the like. However, developing totally different mechanical platforms for different standards and markets consumes considerable engineering time and increases tooling costs. As such, there remains a need for a common mechanical approach which can be used for several different wireless communication standards.

SUMMARY OF THE INVENTION

The present invention utilizes a diversity antenna module which includes a diversity antenna and preferably has outer dimensions no larger than a SIM card. The diversity antenna module mates with a shell housing communications electronics for a wireless communications device, such as communications electronics adapted for PDC operation. The diversity antenna module, when mated to the shell, provides the communications electronics within the shell with an alternative antenna, as is required by the PDC specifications. However, the same shell, or another shell of the same mechanical dimensions, may alternatively house a different set of communications electronics, such as some adapted for GSM operation. Another module, e.g., a traditional SIM module required for GSM operation, may be mated to this second shell to provide alternative communications functionality. Thus, the diversity antenna module allows for a single mechanical design of the shell to be used to house alternative communications electronics and mate with the corresponding modules to provide wireless communications functionality under differing standards. Accordingly, the number of mechanical packaging designs that must be developed is lessened, thereby reducing design time and tooling costs.

DETAILED DESCRIPTION

Figure 1:
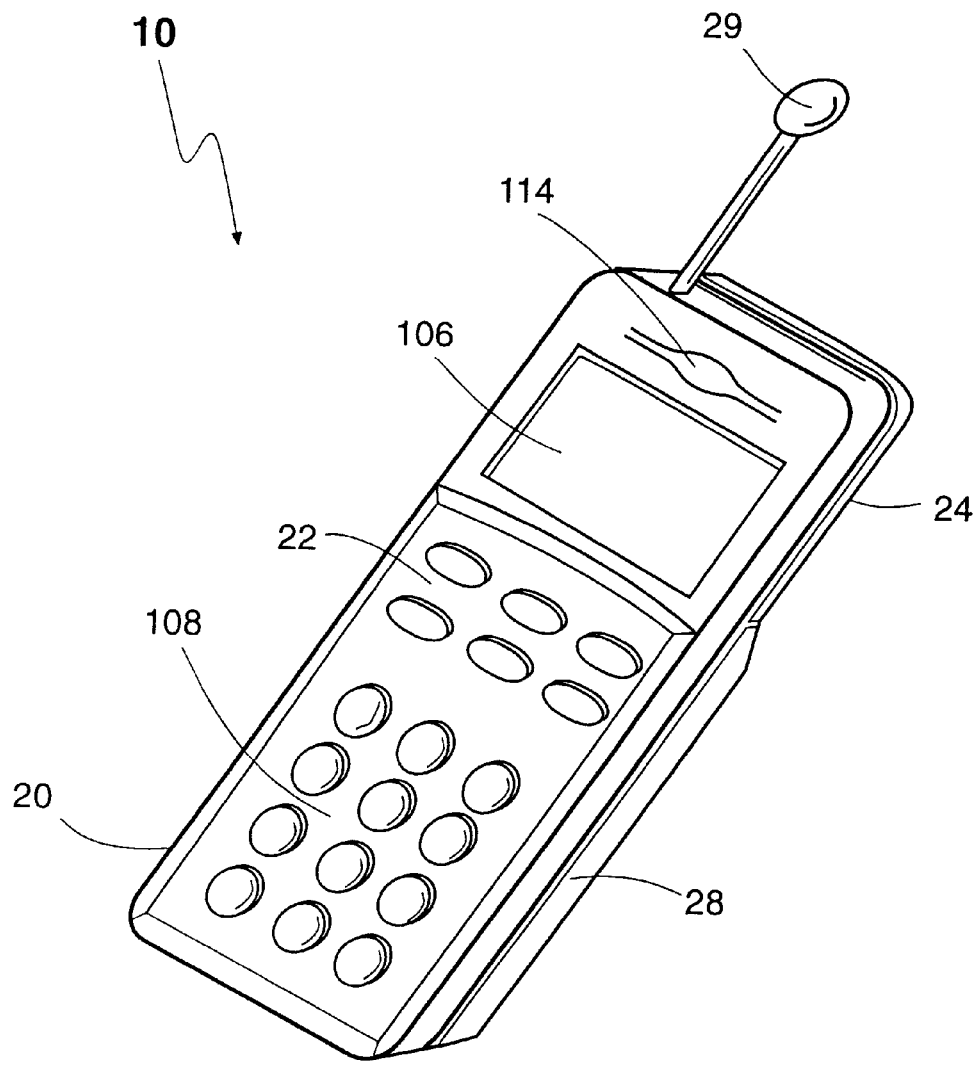
FIG. 1 is a perspective view of the front of a cellular telephone of the prior art.

The present invention provides a module 50 having dimensions no larger than a SIM card that includes a diversity antenna 59. The diversity antenna module 50 is designed to be inserted into a mechanical shell 20 of a wireless communications device mobile terminal 10, bringing the diversity antenna 59 into communication with the associated communications electronics 40. Using this approach, one universal shell design may be used to house electronics for a wireless communications mobile terminal 10 under any one of a variety of multiple standards with little or no modification. For example, the shell 20 may be used to house GSM communications electronics 40 and be coupled with a traditional SIM module 50 for GSM operation. Or, the same shell 20 may be used to house PDC communications electronics 40 and be coupled with the diversity antenna module 50 for PDC operation.

For clarity, the present discussion will assume that the wireless communications mobile terminal 10 is a cellular telephone. However, it is to be understood that other wireless communications devices, such as personal communications assistants, pagers, and the like, are also within the scope of the present invention.

A typical cellular telephone 10 includes a shell 20 having a keypad 108 and display 106 on the front 22 thereof and having a main antenna 29 attached thereto The shell 20 houses appropriate communications electronics 40, such as described more fully below. A battery pack 28 typically attaches to the rear 24 of the shell 20 on a lower portion thereof.

Figure 2:
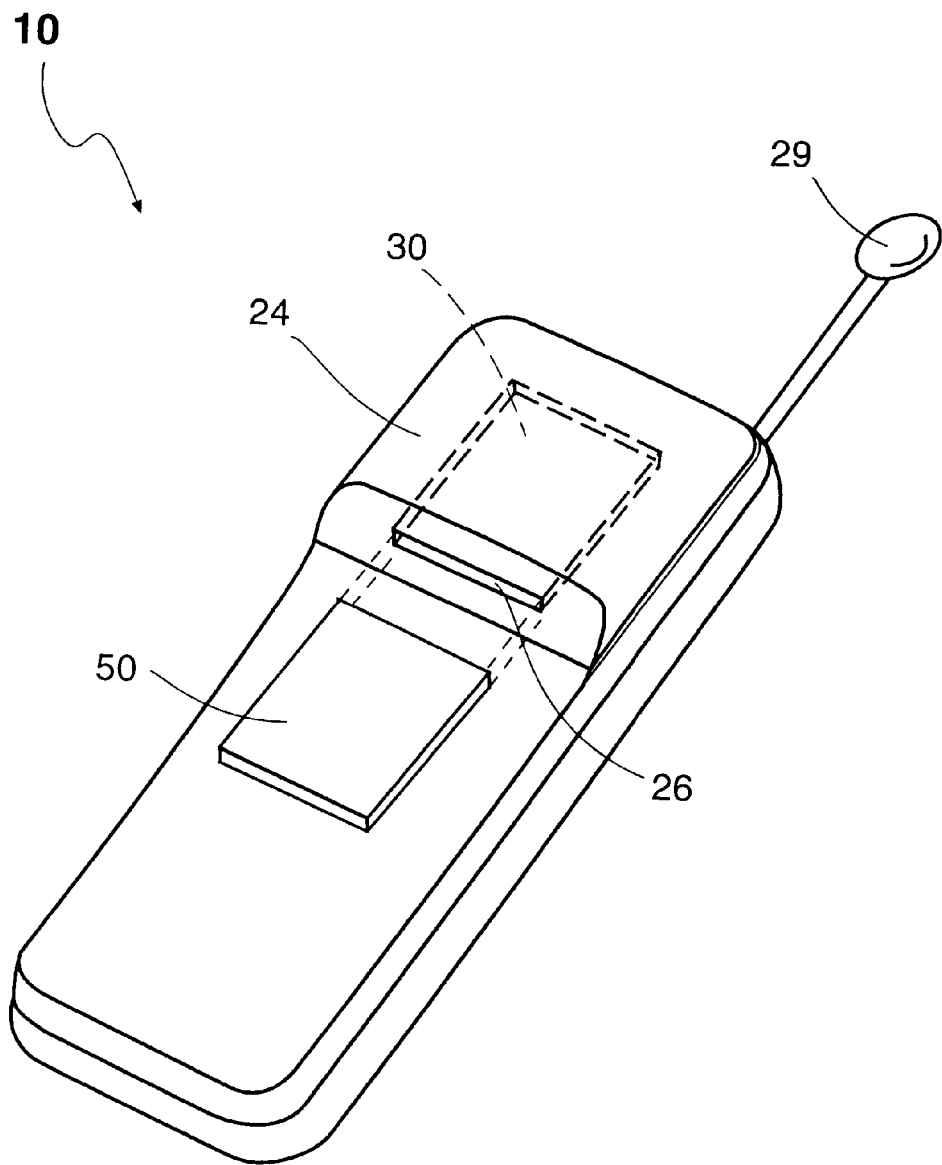
FIG. 2 is a perspective view of the rear of one embodiment of a cellular telephone suitable for the present invention with the location of the module bay in phantom lines.
Figure 2A:
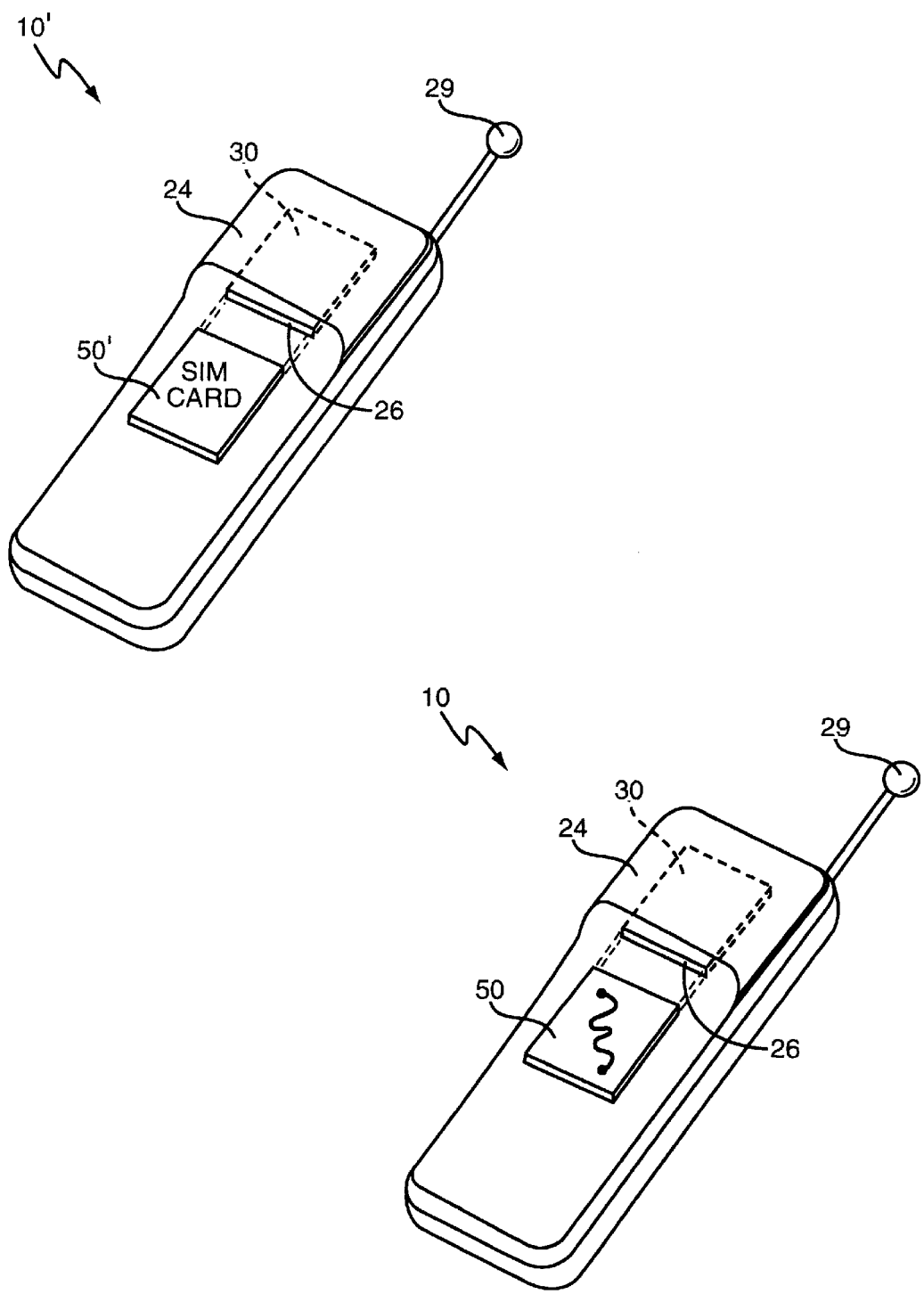
FIG. 2A shows a perspective view of the rear of two cellular telephones and corresponding discrete modules bays shown in phantom lines.

FIG. 2A depicts two configurations of the present invention, according to one embodiment thereof. Mobile terminal 10' is configured for use under the GSM telephony protocol, and receives SIM module 50' mated thereto. Mobile terminal 10 is configured for use under the PDC telephony protocol, and receives SIM-size module 50, containing a diversity antenna, mated thereto.

The shell 20 of the present invention includes a slot 26 leading to a module bay 30. The slot 26 is preferably located on the rear 24 of the shell 20, above the location of the battery pack 28. The slot 26 may be guarded by a flap (not shown) that is preferably normally closed and may be of any type known in the art, such as spring loaded separate piece or portion attached to the main shell 20 via a living hinge. Internal to the shell 20 and disposed adjacent the slot 26 is a module bay 30. In the nodule bay 30 are a plurality of contacts 32. For GSM phones, there are typically six contacts 32 arranged to accept corresponding contacts 52 on a traditional SIM card. For PDC phones, there are typically two contacts 32 arranged to accept corresponding contacts 52 on the diversity antenna module 50. The contacts 32 within the module bay 30 are in communication with the communications electronics 40 and provide a path for information flow between the SIM card or diversity antenna module 50 and the communications electronics 40.

Figure 3:
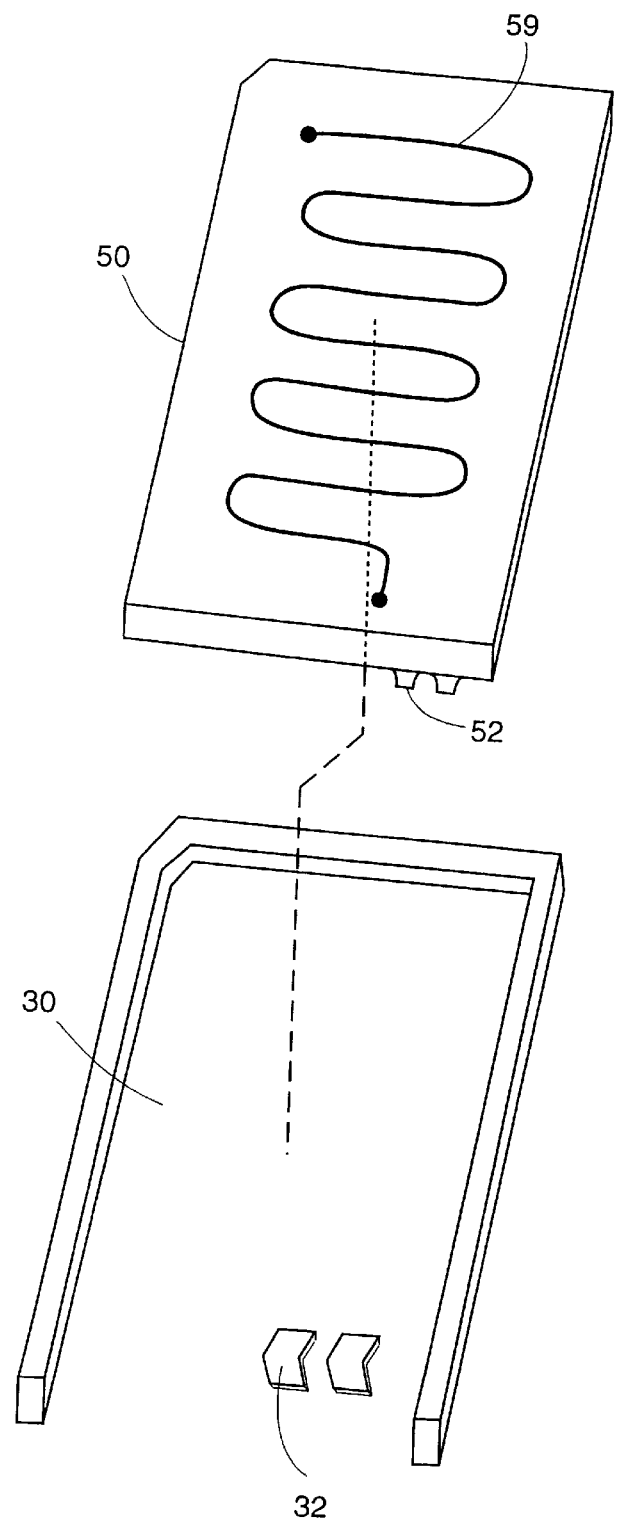
FIG. 3 shows one embodiment of a diversity antenna module and associated module bay.

The diversity antenna module 50 is shown in FIG. 3. The diversity antenna module 50 includes a diversity antenna 59 and associated contacts 52. A diversity antenna 59 is an antenna of a different type than the main antenna 29 associated with the telephone 10. For instance, the main antenna 29 in cellular telephones 10 are typically a rod type or a rod-and-helix type. The diversity antenna 59 in such an instance would be an antenna of a different type, such as a patch antenna or a bow-tie dipole antenna. Associated with the diversity antenna 59 are at least two contacts 52 which allow the diversity antenna 59 to form a portion of a receiving circuit when the contacts 52 are mated to the corresponding contacts 32 in the module bay 30. The module bay 30 is preferably located away from the battery pack 28 so that the diversity antenna 59 of the diversity antenna module 50 will not be shielded from radiowaves by the battery pack 28 (or other components) when the diversity antenna module 50 is inserted into the module bay 30. Further, while the diversity antenna module 50 may contain other electronic components, this is not preferred so that the diversity antenna 59 may function optimally.

Figure 4:
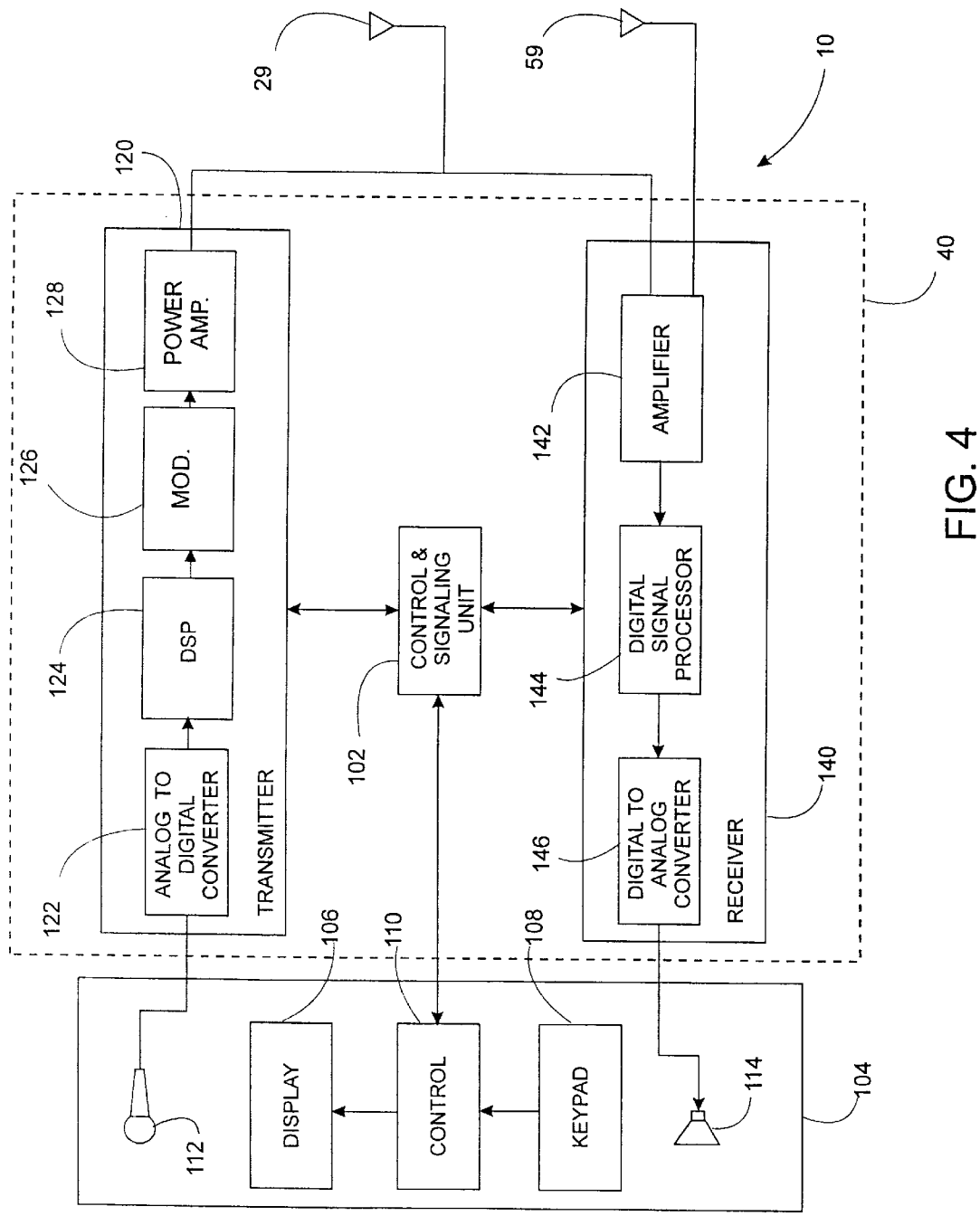
FIG. 4 is a block diagram showing one embodiment of communications electronics suitable for the present invention.

FIG. 4 is a block diagram of a typical cellular telephone 10 showing one embodiment of the communications electronics 40. The cellular telephone 10 shown in FIG. 4 is a fully functional radio transceiver capable of transmitting and receiving digital signals. Those skilled in the art will recognize, however, that the present invention may be implemented in an analog transceiver. The cellular telephone 10 includes a control and signaling unit 102, an operator interface 104, a transmitter 120, the receiver 140, and a main antenna 29.

The operator interface 104 includes a display 106, keypad 108, control unit 110 microphone 112, and speaker 114. The display 106 allows the operator to see dialed digits and call status information. The keypad 108 allows the operator to dial numbers, enter commands, and select options. The control unit 110 interfaces the display 106 and keypad 108 with the control and signaling unit 102. The microphone 112 receives audio signals from the user and converts the audio signals to analog signals. Speaker 114 converts analog signals from the receiver 140 to audio signals that can be heard by the user.

The analog signals from the microphone 112 are applied to the transmitter 120. The transmitter 120 includes an analog to digital converter 122, a digital signal processor 124, a modulator 126, and a power amplifier 128. The analog to digital converter 122 changes the analog signals from the microphone 112 into a digital signal. The digital signal is passed to the digital signal processor (DSP) 124. The digital signal processor 124 compresses the digital signal and inserts error detection, error correction and signaling information. The compressed and encoded signal from the digital signal processor 124 is passed to the modulator 126. The modulator 126 converts the signal to a form that is suitable for transmission on a RF carrier. The power amplifier 128 then boosts the output of the modulator 126 for transmission.

The receiver 140 includes a low noise amplifier 142, a received signal processor 144, and a digital to analog converter 146. Received signals are passed to the low noise amplifier 142 which boosts the low-level RF digital signal to a level appropriate for input to the digital signal processor 144. The digital signal processor 144 includes a demodulator and channel decoder. The demodulator extracts the transmitted bit sequence from the received signal. The channel decoder detects and corrects channel errors in the received signal. The channel decoder also separates control and signaling data from speech data. The digital signal processor 144 may also include an equalizer $^+$ compensate for phase and amplitude distortion of the transmitted signal. The control and signaling data is passed to the control and signaling unit 102. Speech data is processed by a speech decoder and passed to the digital to analog converter 146. The digital to analog converter 146 converts the speech data into an analog signal which is applied to the speaker 114 to generate audible signals which can be heard by the user.

The transmitter 120 and receiver 140 are coupled to the main antenna 29. The main antenna 29 may be used for both transmission and reception. In some embodiments, the receiver 140 may also be coupled to the diversity antenna 59 of the diversity antenna module 50 when the diversity antenna module 50 is inserted into the module bay 30.

The control and signaling unit 102, such as a programmed microprocessor, functions to coordinate the operation of the transmitter 120 and the receiver 140. These functions include power control, channel selection, timing, as well as a host of other functions. The control and signaling unit 102 inserts signaling messages into the transmitted signals and extracts signaling messages from the received signals. In a cellular telephone 10, the control and signaling unit 102 responds to any base station commands contained in the signaling messages, and implements those commands. When the user enters commands via the keypad 108, the commands are transferred to the control and signaling unit 102 for action.

The shell 20 may contain a variety of communications electronics 40. For instance, in some embodiments, the communications electronics 40 may be suitable for GSM operation; in other embodiments, the communications electronics 40 may be suitable for PDC operation. It is anticipated that the shell 20 will enclose different communications electronics 40, that is different printed circuit boards (PCBs), depending on the desired functionality. For those communications electronics 40 adapted for GSM operation, the contacts 32 associated with the module bay 30 will include a suitable number and type to properly interface to a traditional SIM card, as is known in the art. For those communications electronics 40 adapted for PDC operation, the contacts 32 associated with the module bay 30 will include a suitable number and type to properly interface to the diversity antenna module 50. It is anticipated that the module bay 30 will be attached to the PCB containing the communications electronics 40, such as by soldering a suitable receptacle to the PCB.

It will be appreciated that the diversity antenna module 50 should have dimensions no larger than a traditional SIM card so that the universal mechanical shell 20 may be used with either the traditional SIM card (GSM) or the diversity antenna module 50 (PDC). As used herein, the traditional SIM card dimensions are as described in the international specifications known as ISO/IEC 7816-1, "Identification Cards—Integrated Circuit(s) Cards With Contacts—Part 1: Physical Dimensions" and ENV 1375-1, "Identification Card Systems—Intersector Integrated Circuit(s) Card Additional Formats—Part 1: ID-000 Card Size And Physical Characteristics" which are incorporated herein by reference.

It should be noted that these specification allows for two different SIM card sizes, a full size of approximately credit card size, and a "plug-in" SIM card of smaller size. Preferably, the SIM cards and diversity antenna modules 50 conform to the plug-in SIM standard, as this uses less volume; but both sizes fall within the scope of the present invention.

It is anticipated that the diversity antenna module 50 will be roughly rectangular in shape, like a traditional SIM card, but this is not required. Instead, the diversity antenna module 50 may take any shape that fits within the envelope of the traditional SIM card dimensions, such as hourglass, octagonal, etc. Of course, the module bay 30 should have a corresponding shape to properly hold the diversity antenna module 50.

To employ the present invention, a suitable universal shell 20 would be designed to house the variety of communications electronics 40. The differing communications electronics 40 could be designed separately, but would need to have a common module bay 30 location and overall footprint. To create a GSM phone 10, the GSM communications electronics PCB would be selected and placed in the universal shell 20. Thereafter, a traditional SIM card would be inserted through the slot 26 into the module bay 30. On the other hand, to create a PDC phone 10, the PDC communications electronics PCB would be selected and placed in the universal shell 20. Thereafter, a diversity antenna module 50 would be inserted through the slot 26 into the module bay 30. Thus, the diversity antenna module 50 and corresponding shell 20 allow for a single mechanical design of the shell 20 to be used to house alternative communications electronics 40, thereby lessening the number of mechanical packaging designs that must be developed. Accordingly, design time and tooling costs are reduced.

The discussion above has assumed that the diversity antenna 59 is used for PDC applications. This is because the PDC operating specifications currently require the presence of a diversity antenna 59 to supplement the main antenna 29, while most other wireless communications systems do not. However, the diversity antenna 59 may be used in other applications, such as AMPS or D-AMPS in the United States. Obviously, however, with only one module bay 30, a particular phone shell 20 would only be able to use the diversity antenna module 50 in applications where a true SIM module 50 is not required, as the two are mutually exclusive.

As used herein, the phrase "mechanically of the same dimensions" means that the two objects being compared have the same or substantially similar outer dimensions and the same or substantially similar dimensional attributes such as number, placement, and thickness of reinforcing ribs, radius of corners, number of openings, and the like. The phrase "mechanically identical" includes what is encompassed by "mechanically of the same dimensions" and further includes having the same or substantially similar mechanical material properties such as modulus, flexibility, and the like, such as would occur if two objects of "mechanically of the same dimensions" were made from the same general type of material. The phrase "physically identical" includes what is encompassed by "mechanically identical" and further includes same or substantially similar non-mechanical properties such as color, surface texture, electrical permeability, and the like.

As used herein, when a module 50 is described or claimed as being "mated" to a shell 20, this means that the module 50 is either abutting the shell 50 or disposed at least partially, and preferably completely, within the shell 20 so as to be operational. The module 50 is a discrete body from the shell 20 that is intended to be inserted into what has been referred to as a module bay 30. Given that the module bay 30 may be a portion of the shell 20 itself, or may be a portion of the communications electronics 40, or both, describing the module as being "mated" to the shell seems most appropriate and is intended to cover all such embodiments.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A wireless communications device, comprising:
   a) a shell adapted to receive either first communications electronics requiring a cooperating SIM module or second communications electronics requiring a cooperating diversity antenna, having a main antenna connected thereto and containing therein said second communications electronics;
   b) a discrete module mated to said shell and having outer dimensions of a SIM card, adapted to include either SIM electronics or a diversity antenna, and including a diversity antenna suitable for a wireless communication mobile terminal;
   c) said shell adapted to receive said module;
   d) wherein said communications electronics connect to said main antenna and said diversity antenna when said module is joined to said shell for receiving signals from a remote location.

2. The wireless communications device of claim 1 wherein said shell has a front and a rear and further including a battery pack attached to a lower portion of said rear and wherein said module mates to said shell in an upper portion of said shell so as to be not shielded by said battery pack.

3. The wireless communications device of claim 1 wherein said shell includes a module bay and further including a normally closed flap on said shell proximate said module bay and wherein said module removably mates to said shell in said module bay wherein said module is disposed substantially within said module bav when mated to said shell.

4. The wireless communications device of claim 1 wherein said wireless communications device is a cellular telephone.

5. The wireless communications device of claim 1 wherein said communications electronics are adapted for operation in a PDC system.

6. The wireless communications device of claim 1 wherein:
   a) said shell has a front and a rear and further including a battery pack attached to a lower portion of said rear and wherein said module mates to said shell in an upper portion of said shell so as to be not shielded by said battery pack;
   b) said shell includes a module bay and further including a normally closed flap on said shell proximate said module bay and wherein said module mates to said shell in said module bay; and
   c) said wireless communications device is a cellular telephone adapted for operation in a PDC system.

7. A housing set for manufacturing first and second wireless communications devices using the same shell manufacturing process, comprising:
   a) a first shell having a slot therein and housing a first set of communications electronics for the first wireless communications device;
   b) a discrete first module removably mated to said first shell through said slot; said first module having outer dimensions of a SIM card and including SIM electronics and a plurality of first module contacts;
   c) a second shell having a slot therein and housing a second set of communications electronics for the second wireless communications device;
   d) a discrete second module removably mated to said second shell through said slot; said second module having outer dimensions of a SIM card and including a diversity antenna suitable for a wireless communications mobile terminal and a plurality of second module contacts;
   e) wherein said first shell and said second shell are manufactured according to the same process, and are mechanically of the same dimensions.

8. The housing set of claim 7 wherein said first shell and said second shell are mechanically identical.

9. The housing set of claim 7 wherein said first shell and said second shell are physically identical.

10. The housing set of claim 7 further including a first main antenna connected to said first shell and in communication with said first set of communications electronics and a second main antenna connected to said second shell and in communication with said second set of communications electronics.

11. The housing set of claim 7 further including;
   a) a first set of main contacts in communication with said first set of communications electronics and a second set of main contacts in communication with said second set of communications electronics;
   b) wherein said first module contacts associated with said first module are in communication with said SIM electronics and said second module contacts associated with said second module are in communication with said diversity antenna;
   c) wherein said first set of module contacts contact said first set of main contacts when said first module mates to said first shell and said second set of module contacts contact said second set of main contacts when said second module mates to said second shell.

12. The housing set of claim 7 further including a main antenna attached to said second shell and wherein said second set of communications electronics communicate with said main antenna and said diversity antenna of said second module.

13. The housing set of claim 7 wherein said second set of communications electronics are adapted for operation in a PDC wireless communications environment.

14. The housing set of claim 13 wherein said first set of communications electronics are adapted for operation in a GSM wireless communications environment.

15. The housing set of claim 7 further including:
   a) a first main antenna connected to said first shell and in communication with said first set of communications electronics;
   b) a second main antenna connected to said second shell and in communication with said second set of communications electronics;
   c) a first set of main contacts in communication with said first set of communications electronics;
   d) a second set of main contacts in communication with said second set of communications electronics;
   e) and wherein:
      i) said first shell and said second shell are mechanically identical;
      ii) said first module contacts associated with said first module are in communication with said SIM electronics and said second module contacts associated with said second module are in communication with said diversity antenna;
      iii) said first set of module contacts contact said first set of main contacts when said first module mates to said first shell and said second set of module contacts contact said second set of main contacts when said second module mates to said second shell; and
      iv) said second set of communications electronics communicate with said second main antenna and said diversity antenna of said second module.

16. The housing set of claim 15 wherein said second set of communications electronics are adapted for operation in a PDC wireless communications environment.

* * * * *

UNITED STATES PATENT AND TRADEMARK OFFICE
CERTIFICATE OF CORRECTION

PATENT NO. : 6,240,301 B1
DATED : May 29, 2001
INVENTOR(S) : John C. Phillips

It is certified that error appears in the above-identified patent and that said Letters Patent is hereby corrected as shown below:

<u>Title page, item [73],</u>
The assignee "Ericcson Inc." should be -- Ericsson Inc.--.

Signed and Sealed this

Sixth Day of November, 2001

Attest:

*Nicholas P. Godici*

NICHOLAS P. GODICI
*Attesting Officer*  *Acting Director of the United States Patent and Trademark Office*